(12) United States Patent
Won

(10) Patent No.: US 9,923,627 B2
(45) Date of Patent: Mar. 20, 2018

(54) SEMICONDUCTOR DEVICE, SEMICONDUCTOR MEMORY DEVICE AND COMMUNICATION SYSTEM

(71) Applicant: SK hynix Inc., Gyeonggi-do (KR)

(72) Inventor: Hyung-Sik Won, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 163 days.

(21) Appl. No.: 14/930,302

(22) Filed: Nov. 2, 2015

(65) Prior Publication Data
US 2016/0359553 A1    Dec. 8, 2016

(30) Foreign Application Priority Data

Jun. 4, 2015 (KR) .................. 10-2015-0079122

(51) Int. Cl.
*H04L 27/00*  (2006.01)
*H04B 7/24*  (2006.01)

(52) U.S. Cl.
CPC ..................... *H04B 7/24* (2013.01)

(58) Field of Classification Search
CPC .. H03F 3/19; G11C 7/04; G11C 5/147; G11C 11/4094; H03K 17/14; H03K 2005/0013; H03K 2005/00143; H03K 2217/0027; H03K 3/011; H03K 5/153
USPC ... 365/211, 189.9, 191, 189.11, 189.15, 212; 327/512, 513, 83, 262, 378; 375/259
See application file for complete search history.

(56) References Cited

U.S. PATENT DOCUMENTS

| 6,320,798 B1 * | 11/2001 | Jo ........................ G11C 11/4091 365/189.11 |
| 8,390,265 B2 * | 3/2013 | Kang ..................... G11C 5/147 323/314 |

FOREIGN PATENT DOCUMENTS

| KR | 1020090099376 | 9/2009 |
| KR | 1020140029818 | 3/2014 |

* cited by examiner

*Primary Examiner* — Rahel Guarino
(74) *Attorney, Agent, or Firm* — IP & T Group LLP

(57) ABSTRACT

A semiconductor device may include: a conversion value generator suitable for detecting first and second transition factors that are independent of each other, and generating first and second conversion values corresponding to the first and second transition factors, respectively; and a signal converter suitable for generating an output signal by reflecting the first and second conversion values into an input signal.

18 Claims, 9 Drawing Sheets

SEMICONDUCTOR DEVICE, SEMICONDUCTOR MEMORY DEVICE AND COMMUNICATION SYSTEM

CROSS-REFERENCE TO RELATED APPLICATIONS

The present application claims priority of Korean Patent Application No. 10-2015-0079122, filed on Jun. 4, 2015, which is incorporated herein by reference in its entirety.

BACKGROUND

1. Field

Exemplary embodiments of the present invention relate to a semiconductor design technology, and more particularly, to a semiconductor device which converts an input signal.

2. Description of the Related Art

Semiconductor devices including Double Data Rate Synchronous DRAM (DDR SDRAM) generally receive a command signal, an address signal, a data signal and the like from an external controller, and perform various operations. Semiconductor devices do not immediately use the command signal, the address signal and the data signal as they are, but convert the signals according to their operation characteristics. Thus, the semiconductor device includes a circuit for converting the input signal.

With the development of process and design technology, semiconductor devices have continued to be reduced in size while increasing operating speeds. Under these conditions, circuit operations can be disrupted by even small changes in the operating environment. Thus, a variety of methods have been developed to prevent such unexpected changes in circuit operations. The main purpose of such methods is to control the corresponding circuits to perform operations properly at all times.

SUMMARY

Various embodiments are directed to a semiconductor device, a semiconductor memory device and a communication system, capable of converting an input signal according to a surrounding environment.

In accordance with an embodiment of the present invention, a semiconductor device may include: a conversion value generator suitable for detecting first and second transition factors independent of each other, and generating first and second conversion values corresponding to the first and second transition factors, respectively; and a signal converter suitable for generating an output signal by reflecting the first and second conversion values into an input signal.

The input signal may have one or more unique characteristics, and values of the one or more unique characteristics are controlled in response to the first and second conversion values.

The conversion value generator may include first and second detection units for detecting the first and second transition factors, respectively.

The signal converter may include: a first conversion unit suitable for reflecting the first conversion value into the input signal; and a second conversion unit suitable for reflecting the second conversion value into an output signal of the first conversion unit.

The first conversion unit may include: a plurality of reflection units each suitable for reflecting different reflection values to the input signal; and a path control unit suitable for selecting one or more of output signals of the reflection units according to the first conversion value.

The second conversion unit may include: a plurality of reflection units each suitable for reflecting different reflection values to the output signal of the first conversion unit; and a path control unit suitable for selecting one or more of output signals of the reflection units according to the second conversion value.

In accordance with another embodiment of the present invention, a semiconductor device may include: a bit line sense amplifier suitable for sensing and amplifying data provided through a bit line coupled to a memory cell; a voltage driver suitable for providing pull-up/pull-down voltages to the bit line sense amplifier in response to first and second control signals; a conversion value generator suitable for detecting first and second transition factors independent of each other, and generating first and second conversion values corresponding to the first and second transition factors; and a sense amplification controller suitable for generating the first and second control signals by reflecting the first and second conversion values into an enable signal of the bit line sense amplifier.

The sense amplification controller may control a delay amount of the enable signal according to the first and second conversion values.

The sense amplification controller may control the transition sequence of the first and second control signals according to the first conversion value, and may control a transition interval between the first and second control signals according to the second conversion value.

The first and second transition factors may comprise a voltage and a temperature, respectively.

In accordance with yet another embodiment of the present invention, a communication system may include: a transmitter suitable for generating a transmission signal having one or more unique characteristics into which first and second transition factors independent of each other are reflected; and a receiver suitable for receiving the transmission signal and detecting the first and second transition factors.

A communication system may further include an information storage unit suitable for providing information of the one or unique characteristics to the receiver.

The transmitter may include: a conversion value generator suitable for detecting the first and second transition factors and generating first and second conversion values corresponding to the first and second transition factors, respectively; and a signal converter suitable for generating the transmission signal by reflecting the first and second conversion values into an input signal.

The conversion value generator may comprise first and second detection units for detecting the first and second transition factors, respectively. The receiver may include: a plurality of detection units suitable for detecting the unique characteristics of the transmission signal; and an analysis unit suitable for detecting the first and second transition factors based on output signals of the plurality of detection units.

The communication system may further include a detection selection unit suitable for selecting a corresponding one among the plurality of detection units in response to information of the unique characteristics.

The unique characteristics of the transmission signal may comprise a transition point and a voltage level after transition of the transmission signal.

The plurality of detection units may include: a delay amount detection unit suitable for detecting the transition point of the transmission signal; and a level detection unit suitable for detecting the voltage level after transition of the transmission signal.

The semiconductor device can reflect transition factors representing a surrounding environment into an input signal, and output a signal in response to the transition-factor-reflected input signal.

DETAILED DESCRIPTION

Figure 1:
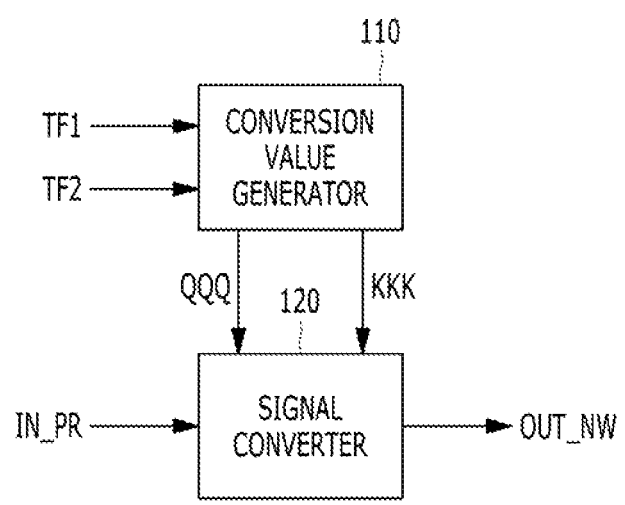
FIG. 1 is a block diagram illustrating a semiconductor device in accordance with an embodiment of the present invention.

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

In the conventional semiconductor device, the changes of an input signal and an output signal have been controlled to the same value, even though the surrounding environment is changed. However, a semiconductor device in accordance with an embodiment of the present invention can control an input signal and an output signal to have different changes according to changes in the surrounding environment.

FIG. 1 is a block diagram illustrating a semiconductor device in accordance with an embodiment of the present invention.

Referring to FIG. 1, the semiconductor device may include a conversion value generator 110 and a signal converter 120.

The conversion value generator 110 may detect first and second transition factors TF1 and TF2, and generate a first conversion value QQQ corresponding to the first transition factor TF1 and a second conversion value KKK corresponding to the second transition factor TF2. The first and second transition factors TF1 and TF2 may be surrounding environment factors independent of each other, and correspond to process, voltage, and temperature, for example. Hereafter, suppose that the first transition factor TF1 is a voltage and the second transition factor TF2 is a temperature. That is, the conversion value generator 110 may detect a voltage as the first transition factor TF1, and output the first conversion value QQQ corresponding to the detected voltage. Furthermore, the conversion value generator 110 may detect a temperature as the second transition factor TF2, and output the second conversion value KKK corresponding to the detected temperature.

The signal converter 120 may reflect the first and second conversion values QQQ and KKK into an input signal IN_PR. The input signal IN_PR may be of various types. For example, the input signal IN_PR may be a level signal which transitions at a predetermined time or a pulse signal which has a predetermined pulse width at a predetermined time. Each of the level signal and the pulse signal may have unique characteristics. For example, a transition point or voltage level before/after the transition may be the unique characteristic of the level signal. For example, an enablement/disablement point of a pulse, a pulse width, or a voltage level in an enablement/disablement state of the pulse may be the unique characteristic of the pulse signal. The signal converter 120 may modify the unique characteristic of the input signal IN_PR according to the first conversion value QQQ and the second conversion value KKK, which will be described later.

Figure 2:
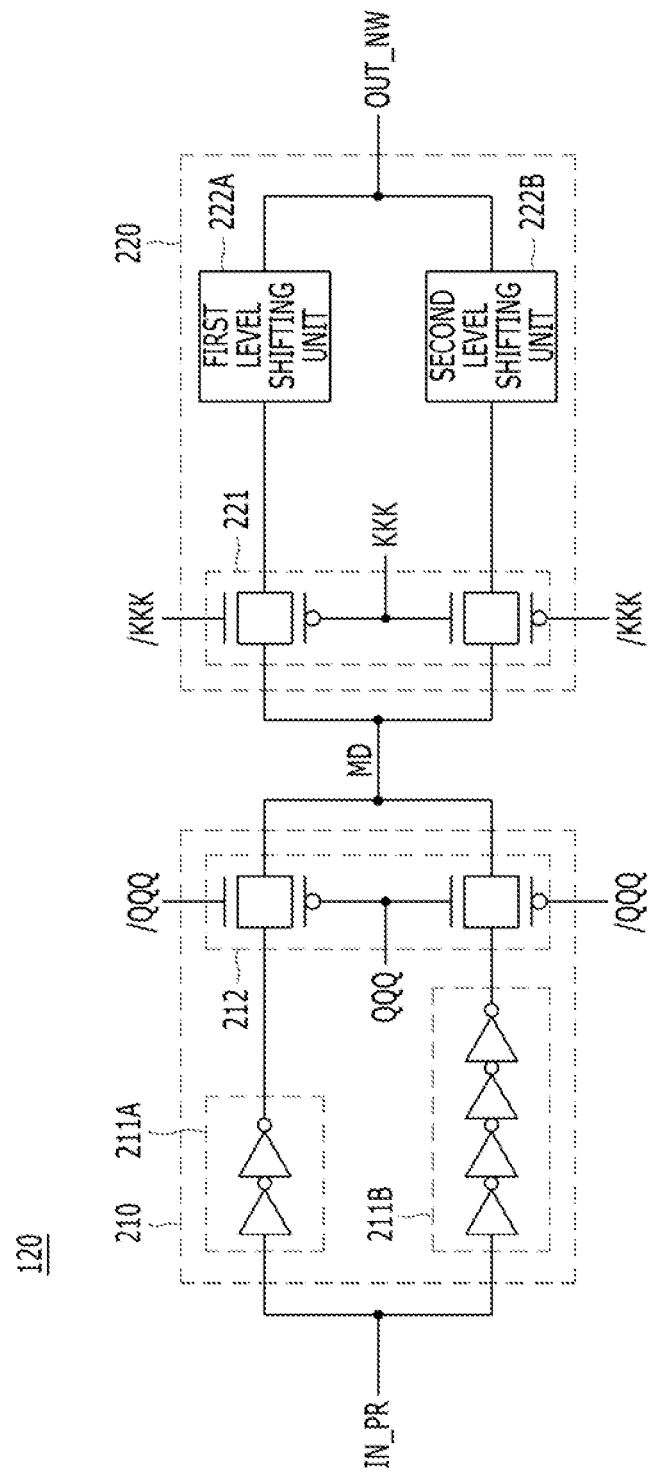
FIG. 2 is a block diagram illustrating a signal converter shown in FIG. 1.

FIG. 2 is a block diagram illustrating the signal converter 120 shown in FIG. 1.

It is exemplarily assumed that the input signal IN_PR in FIG. 2 is a level signal which transitions at a predetermined point of time, and the unique characteristic of the input signal IN_PR is a transition point and a voltage level after the transition.

Referring to FIG. 2, the signal converter 120 may include a first conversion unit 210 and a second conversion unit 220. The first conversion unit 210 may reflect the first conversion value QQQ into the input signal IN_PR and the second conversion unit 220 may reflect the second conversion value KKK into an interim signal MD of the first conversion unit 210.

The first conversion unit 210 may generate an interim signal MD by reflecting delay into the input signal IN_PR according to the surrounding environment.

The first conversion unit 210 may include a first delay reflection unit 211A, a second delay reflection unit 211B, and a first path control unit 212. The first delay reflection unit 211A may reflect a first delay amount into the input signal IN_PR. The second delay reflection unit 211B may reflect a second delay amount into the input signal IN_PR. The first path control unit 212 may select one of output signals from the first and second delay reflection units 211A and 211B in response to the first conversion value QQQ.

For example, when the voltage is low, the first conversion value QQQ becomes logic low and a delay amount corresponding to two inverters formed in the first delay reflection unit 211A may be reflected into the input signal IN_PR. On the other hand, when the voltage is high, the first conversion value QQQ becomes logic high and a delay amount corresponding to four inverters formed in the second delay reflection unit 211B may be reflected into the input signal IN_PR.

As can be seen from the example, the unique characteristic of the input signal IN_PR may change through the first and second delay reflection units 211A and 211B and the conversion value QQQ corresponding to the voltage or the transition factor representing the surrounding environment. Further, the delay amount or the amount of change may be controlled through the first and second delay reflection units 211A and 211B and the conversion value QQQ corresponding to the voltage or the transition factor representing the surrounding environment. In the present embodiment, the first delay reflection unit 211A may be designed to include two inverters, and the second delay reflection unit 211B may be designed to include four inverters, the number of which included in the first and second delay reflection units 211A and 211B may vary in a digital or analog gray according to design.

The second conversion unit 220 may generate a transmission signal OUT_NW by reflecting voltage level shift into the interim signal MD according to the surrounding environment.

The second conversion unit 220 may include a second path control unit 221, a first level shifting unit 222A, and a second level shifting unit 222B. The second path control unit 221 may select one of the first and second level shifting units 222A and 222B for receiving the interim signal MD of the first conversion unit 210. The first level shifting unit 222A may shift the interim signal MD of the first conversion unit 210 to a first voltage level and output the voltage-shifted interim signal MD as the transmission signal OUT_NW. The second level shifting unit 222B may shift the interim signal MD to a second voltage level and output the voltage-shifted interim signal MD as the transmission signal OUT_NW. As another embodiment, the second path control unit 221 may be provided behind the first and second level shifting units 222A and 222B to select one of output signals of the first and second level shifting units 222A and 222B.

For example, when the temperature is low, the second conversion value KKK becomes logic low, and the interim signal MD may be transmitted to the first level shifting unit 222A and the first voltage level may be reflected to the interim signal MD. On the other hand, when the temperature is high, the second conversion value KKK becomes logic high, and the interim signal MD may be transmitted to the second level shifting unit 222B and the second voltage level may be reflected to the interim signal MD.

As can be seen from the example, the unique characteristic of the input signal IN_PR may change through the first and second level shifting units 222A and 222B and the conversion value KKK corresponding to the temperature or the transition factor representing the surrounding environment. Further, the shift amount of the voltage level for the input signal IN_PR or the amount of change may be controlled through the first and second level shifting units 222A and 222B and the conversion value KKK corresponding to the voltage or the transition factor representing the surrounding environment.

The semiconductor device in accordance with the embodiment of the present invention can convert the input signal IN_PR according to the surrounding environment exemplarily represented by the voltage serving as the first conversion value QQQ and the temperature serving as the second conversion value KKK.

In accordance with an exemplary embodiment of the present invention described with reference to FIGS. 1 and 2, the input signal IN_PR as the level signal can be changed into four cases. Hereafter, the conversion of the input signal IN_PR based on the voltage and temperature as the surrounding environment will be described with reference to FIG. 3.

Figure 3:
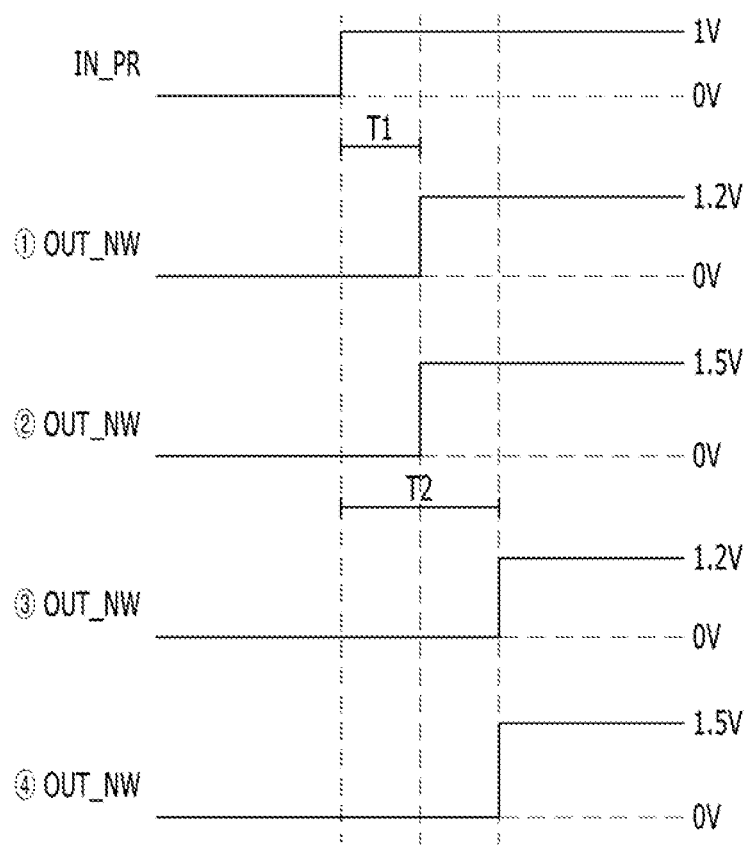
FIG. 3 is a waveform diagram illustrating a circuit operation of the signal converter shown in FIG. 2.

FIG. 3 is a waveform diagram illustrating a circuit operation of the signal converter 120 shown in FIG. 2.

FIG. 3 discloses the input signal IN_PR of a range from 0V to 1V and the transmission signal OUT_NW which is converted into four cases. As an example, suppose that the first and second delay reflection units 211A and 211B delay the input signal IN_PR by amounts of T1 and T2, respectively, and the first and second level shifting units 222A and 222B shift the voltage of the interim signal MD to 1.2V and 1.5V, respectively.

In case ①, the voltage is low and the temperature is low. In case ①, the input signal IN_PR may be converted into the transmission signal OUT_NW through the first delay reflection unit 211A and the first level shifting unit 222A according to the first conversion value QQQ of a low logic and the second conversion value KKK of a low logic. As a result, the transmission signal OUT_NW may be delayed by T1 from the input signal IN_PR and have a high voltage of 1.2V.

In case ②, the voltage is low and the temperature is high. In case ②, the input signal IN_PR may be converted into the transmission signal OUT_NW through the first delay reflection unit 211A and the second level shifting unit 222B according to the first conversion value QQQ of a low logic and the second conversion value KKK of a high logic. As a result, the transmission signal OUT_NW may be delayed by T1 from the input signal IN_PR and have a high voltage of 1.5V.

In case ③, the voltage is high and the temperature is low. In case ③, the input signal IN_PR may be converted into the transmission signal OUT_NW through the second delay reflection unit 211B and the first level shifting unit 222A according to the first conversion value QQQ of a high logic and the second conversion value KKK of a low logic. As a result, the transmission signal OUT_NW may be delayed by T2 from the input signal IN_PR and have a high voltage of 1.2V.

In case ④, the voltage is high and the temperature is high. In case ④, the input signal IN_PR may be converted into the transmission signal OUT_NW through the second delay reflection unit 211B and the second level shifting unit 222A according to the first conversion value QQQ of a high logic and the second conversion value KKK of a high logic. The transmission signal OUT_NW may be delayed by T2 from the input signal IN_PR, and have a high voltage of 1.5V. For reference, although the level shifting operation is performed on the high voltage level of the input signal IN_PR in the cases ①, ②, ③, and ④, the level shifting operation can also be performed on the low voltage level of the input signal IN_PR.

The semiconductor device in accordance with the embodiment of the present invention may reflect a temperature and voltage as the surrounding environment into the input signal IN_PR, in order to convert the input signal IN_PR into different signals.

In the above embodiment, the unique characteristics of the level signal were controlled in a state where the input signal IN_PR is set to the level signal. Among the unique characteristics of the level signal, the transition point and voltage level after transition were controlled. As described above, however, the input signal IN_PR may include a level signal or pulse signal, and each signal may have various unique characteristics. Thus, the embodiment of the present invention may include all types of characteristics corresponding to the input signal IN_PR.

Furthermore, in the above embodiment, two unique characteristics were controlled in response to the first conversion value QQQ and the second conversion value KKK, respectively. Hereafter, a configuration for controlling one unique characteristic in response to the first conversion value QQQ and the second conversion value KKK will be described as follows.

Figure 4:
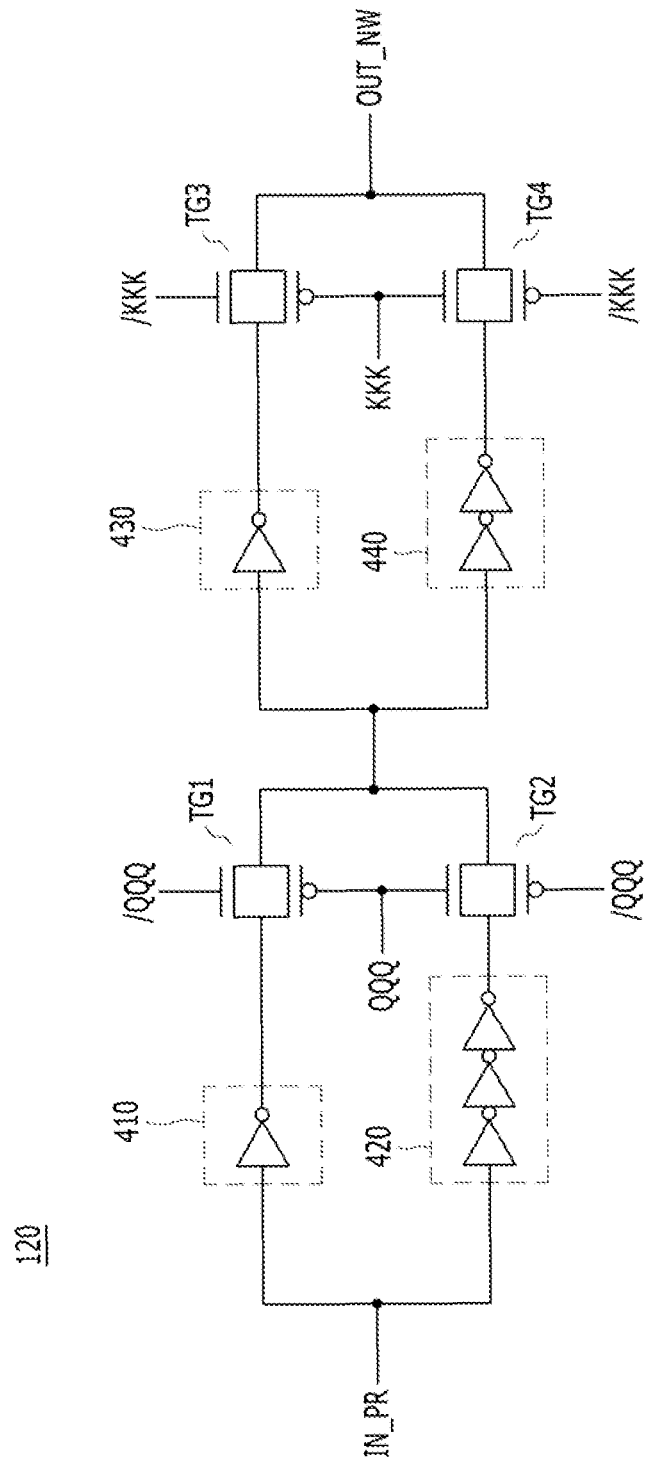
FIG. 4 is a diagram for describing another embodiment of the signal converter shown in FIG. 1.

FIG. 4 is a diagram for describing another embodiment of the signal converter 120 shown in FIG. 1.

The signal converter 120 of FIG. 4 can control the transition point of the input signal IN_PR in response to voltage and temperature as the surrounding environment.

Referring to FIG. 4, the signal converter 120 may include first to fourth delay reflection units 410 to 440 and first to fourth path control unit TG1 to TG4.

The first to fourth delay reflection units 410 to 440 may delay the input signal IN_PR by their respective delay amounts. The first to fourth path control units TG1 to TG4 may selectively transfer output signals of the first to fourth delay reflection units 410 to 440, respectively.

For example, each of the first and third delay reflection units 410 and 430 may include one inverter, the second delay reflection unit 420 may include three inverters, and the fourth delay reflection unit 440 may include four inverters. Each of the first and second path control units TG1 and TG2 may include a transmission gate to selectively transfer the output signals of the first and second delay reflection units 410 and 420 in response the first conversion value QQQ. Each of the third and fourth path control units TG3 and TG4 may include a transmission gate to selectively transfer the output signals of the third and fourth delay reflection units 430 and 440 in response to the second conversion value KKK.

The first and second delay reflection units 410 and 420 and the first and second path control units TG1 and TG2 may be the same as the first conversion unit 210 described with reference to FIGS. 2 and 3 except for the number of inverters included in the delay reflection units. The third and fourth delay reflection units 430 and 440 and the third and fourth path control units TG3 and TG4 may be the same as the first conversion unit 210 described with reference to FIGS. 2 and 3 except for the number of inverters included in the delay reflection units as well as the conversion value.

As can be seen from the example, the unique characteristic of the input signal IN_PR may change through the first to fourth delay reflection units 410 to 440 and the conversion values QQQ and KKK corresponding to the voltage and the temperature or the transition factors representing the surrounding environment. Further, the delay amount or the amount of change may be controlled through the first to fourth delay reflection units 410 to 440 and the conversion values QQQ and KKK corresponding to the voltage and the temperature or the transition factors representing the surrounding environment. The number of inverters included in the first to fourth delay reflection units 410 to 440 may vary in a digital or analog way according to design.

The semiconductor device in accordance with an embodiment of the present invention can convert the delay amount reflected into the input signal IN_PR according to the surrounding environment exemplarily represented by the voltage as the first conversion value QQQ and the temperature as the second conversion value KKK.

In accordance with the exemplary embodiment of the present invention described with reference to FIGS. 1 and 4, the input signal IN_PR as the level signal can be changed into four cases. Hereafter, the conversion of the input signal IN_PR based on the voltage and temperature as the surrounding environment will be described with reference to FIG. 5.

Figure 5:
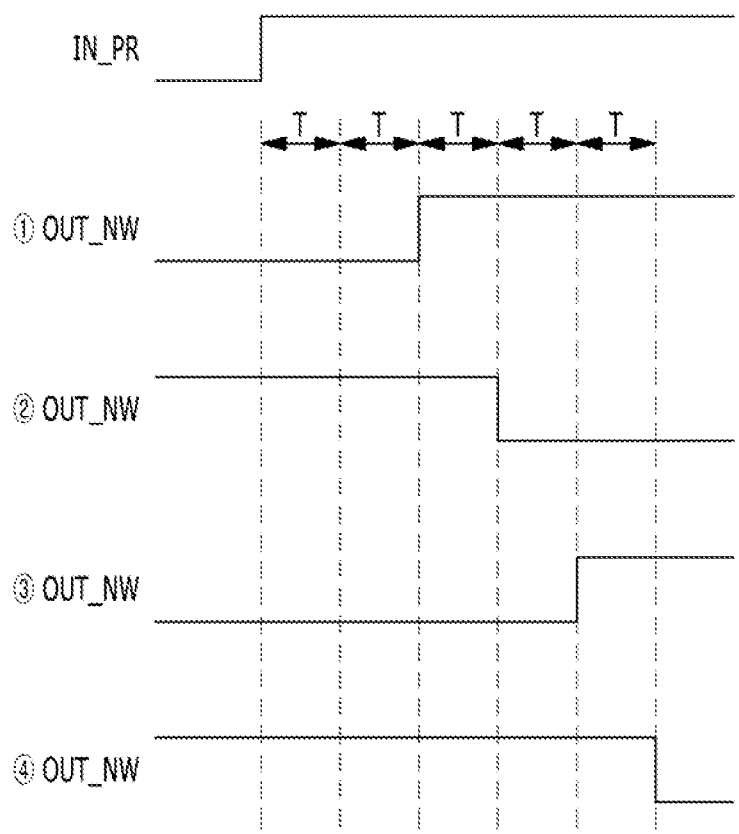
FIG. 5 is a waveform diagram illustrating a circuit operation of the signal converter shown in FIG. 4.

FIG. 5 is a waveform diagram illustrating a circuit operation of the signal converter 120 shown in FIG. 4.

FIG. 5 discloses the input signal IN_PR and the transmission signal OUT_NW which is converted into four cases. As an example, suppose that each of the first to fourth delay reflection units 410 to 440 delay the input signal IN_PR by an amount of T.

In case ①, the voltage is low and the temperature is low. In case ①, the input signal IN_PR may be converted into the transmission signal OUT_NW through 2 inverters of the first and third delay reflection units 410 and 430 according to the first conversion value QQQ of a low logic and the second conversion value KKK of a low logic. As a result, the transmission signal OUT_NW may be delayed by 2T from the input signal IN_PR.

In case ②, the voltage is low and the temperature is high. In case ②, the input signal IN_PR may be converted into the transmission signal OUT_NW through 3 inverters the first and fourth delay reflection units 410 and 440 according to the first conversion value QQQ of a low logic and the second conversion value KKK of a high logic. As a result, the transmission signal OUT_NW may be delayed by 3T from the inverted input signal IN_PR.

In case ③, the voltage is high and the temperature is low. In case ③, the input signal IN_PR may be converted into the transmission signal OUT_NW through 4 inverters of the second and third delay reflection units 420 and 430 according to the first conversion value QQQ of a high logic and the second conversion value KKK of a low logic. As a result, the transmission signal OUT_NW may be delayed by 4T from the input signal IN_PR.

In case ④, the voltage is high and the temperature is high. In case ④, the input signal IN_PR may be converted into the transmission signal OUT_NW through 5 inverters of the second and fourth delay reflection units 420 and 440 according to the first conversion value QQQ of a high logic and the second conversion value KKK of a high logic. The transmission signal OUT_NW may be delayed by 5T from the inverted input signal IN_PR.

As described above, the semiconductor device in accordance with the embodiment of the present invention can reflect the first to fourth delay amounts into the input signal IN_PR in response to the first conversion value QQQ and the second conversion value KKK representing the surrounding environment. This may indicate that the unique characteristic of the input signal IN_PR, that is the transition point can be controlled according to the surrounding environment.

Figure 6:
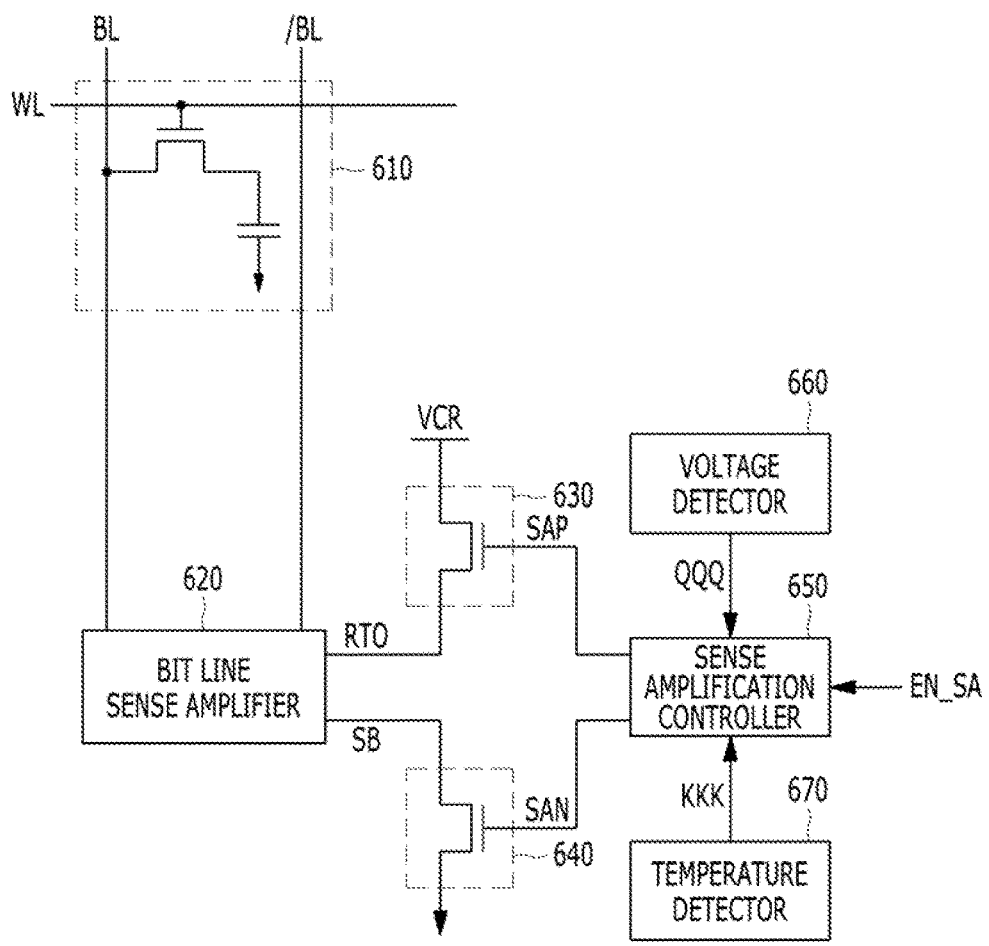
FIG. 6 is a block diagram illustrating a semiconductor memory device in accordance with an embodiment of the present invention.

FIG. 6 is a block diagram illustrating a semiconductor memory device in accordance with an embodiment of the present invention.

Referring to FIG. 6, the semiconductor memory device may include a memory cell 610, a bit line sense amplifier 620, a pull-up driver 630, a pull-down driver 640, a sense amplification controller 640, a voltage detector 660, and a temperature detector 670.

The memory cell 610 may serve to store data, and include one cell transistor and one cell capacitor, for example. The bit line sense amplifier 620 may serve to receive data through a bit line BL coupled to the memory cell 610 and amplify the received data. The bit line sense amplifier 620 may be coupled to the bit line BL through which data is transmitted, and a bit line bar/BL to which comparison target data is transmitted during an amplification operation.

The pull-up driver 630 may provide a core voltage VCR as a pull-up voltage to a pull-up driving line RTO in response to a pull-up control signal SAP, and the pull-down driver 640 may provide a ground voltage VSS as a pull-down voltage to a pull-down driving line SB in response to a pull-down control signal SAN. For reference, although the core voltage VCT and the ground voltage VSS are provided to the pull-up driving line RTO and the pull-down driving line SB, respectively, this configuration may differ depending on design.

The sense amplification controller 650 may generate the pull-up control signal SAP and the pull-down control signal SAN by reflecting the first conversion value QQQ and the second conversion value KKK into a sense amplification enable signal EN_SA. The enablement points of the pull-up control signal SAP and the pull-down control signal SAN may be controlled according to the first conversion value QQQ and the second conversion value KKK. For example, suppose that the first conversion value QQQ corresponds to a voltage and the second conversion value KKK corresponds to a temperature among various transition factors. Thus, in order to detect the temperature and voltage, the following components for detecting the temperature and voltage can be added.

The voltage detector 660 may generate the first conversion value QQQ by detecting a voltage as a transition factor, and the temperature detector 670 may generate the second conversion value KKK by detecting a temperature as another transition factor. As described above, various transition factors may be applied. In the present embodiment, the voltage and temperature may be taken as examples of the transition factors.

Hereafter, a simple read operation of the semiconductor memory device will be described as follows.

When the word line WL is activated during a read operation, data stored in the memory cell may be transmitted to the bit line BL through a charge sharing operation. The transmitted data may be sensed and amplified by the bit line sense amplifier 620, and then transmitted to the outside. Then, the read operation may be ended.

The bit line sense amplifier 620 may be coupled to the pull-up driving line RTO and the pull-down driving line SB, and perform an amplification operation using the core voltage VCR provided to the pull-up driving line RTO and the ground voltage VSS provided to the pull-down driving line SB. At this time, the core voltage VCR may be provided to the pull-up driving line RTO in response to the pull-up control signal SAP, and the ground voltage VSS may be provided to the pull-down driving line SB in response to the pull-down control signal SAN. Furthermore, the enablement points of the pull-up control signal SAP and the pull-down control signal SAN may be controlled according to the first conversion value QQQ and the second conversion value KKK.

The semiconductor memory device in accordance with the embodiment of the present invention may control the enablement points of the pull-up control signal SAP and the pull-down control signal SAN and thus control the point of time that the core voltage VCR is applied to the pull-up driving line RTO and the point of time that the ground voltage VSS is applied to the pull-down driving line SB according to the voltage and temperature of the surrounding environment.

Figure 7:
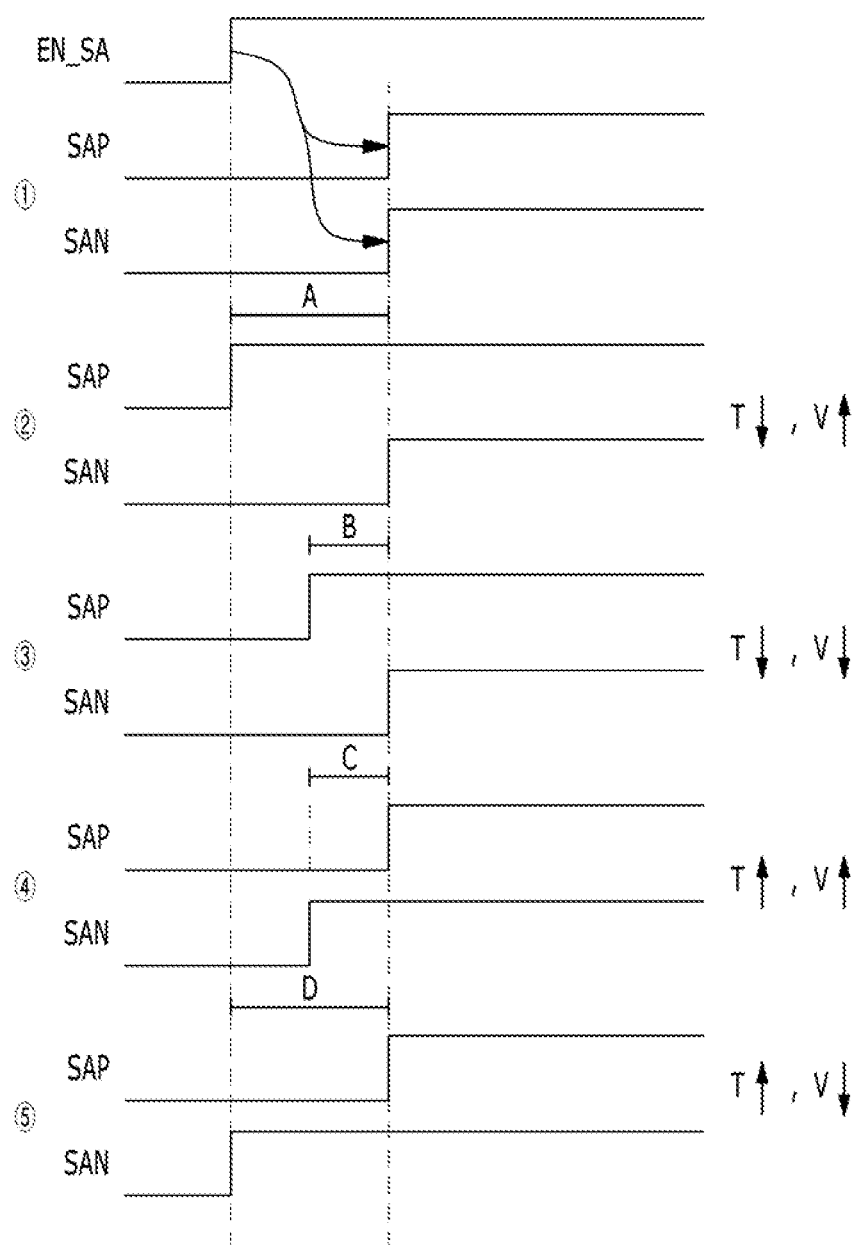
FIG. 7 is a timing diagram illustrating an operation of the semiconductor memory device shown in FIG. 6.

FIG. 7 is a timing diagram illustrating an operation of the semiconductor memory device shown in FIG. 6. FIG. 7 illustrates the enablement points of the pull-up control signal SAP and the pull-down control signal SAN according to the temperature T and the voltage V.

Referring to FIGS. 6 and 7, the sense amplification controller 650 may concurrently enable the pull-up control signal SAP and the pull-down control signal SAN in response to the sense amplification enable signal EN_SA as indicated by case ①.

In case ②, the temperature T is relatively low and the voltage V is relatively high. In this case, the pull-up control signal SAP can be enabled in advance by an amount of "A" before the pull-down control signal SAN is enabled. In case ③, the temperature T is relatively low and the voltage V is relatively low. In this case, the pull-up control signal SAP can be enabled in advance by an amount of "B" before the pull-down control signal SAN is enabled. The amount "A" may be greater than the amount "B". In other words, when the temperature T is relatively low, the pull-up control signal SAP may be enabled before the pull-down control signal SAN as indicated by the cases ② and ③. When the voltage V is high as shown in case ②, the enablement point of the pull-up control signal SAP may be advanced more than when the voltage V is low as shown in case ③.

In case ④, the temperature T is relatively high and the voltage V is relatively high. In this case, the pull-down control signal SAN can be enabled in advance by an amount "C" before the pull-up control signal SAP is enabled. In case ⑤, the temperature T is relatively high and the voltage V is relatively low. In this case, the pull-down control signal SAN can be enabled in advance by an amount "D" before the pull-up control signal SAP is enabled. The amount "C" may be smaller than the amount "D". In other words, when the temperature T is high, the down control signal SAN may be enabled before the pull-up control signal SAP as indicated by the cases ④ and ⑤. When the voltage V is high as shown in case ④, the enablement point of the pull-down control signal SAN may lag more than when the voltage V is low as shown in case ⑤.

As a result, the transition sequence of the pull-up control signal SAP and the pull-down control signal SAN can be controlled according to the temperature T, and the transition interval therebetween can be controlled according to the voltage V.

A semiconductor memory device in accordance with the embodiment of the present invention can control the enablement points of the pull-up control signal SAP and the pull-down control signal SAN according to voltage and temperature. This may indicate that the point of time at which power is applied to the pull-up driving line RTO and the pull-down driving line SB coupled to the bit line sense amplifier 620 can be controlled according to the voltage and temperature. Furthermore, when the point of time at which power is applied to the bit line sense amplifier 620 is controlled, a write recovery time tWR and a refresh characteristic can be optimized according to the corresponding temperature and voltage.

FIGS. 4 and 5 illustrate an example in which four kinds of delay amounts are reflected according to temperature and voltage. FIGS. 6 and 7 illustrates an example in which three kinds of delay amounts are reflected into the pull-up control signal SAP according to temperature and voltage, and three kinds of delay amounts are also reflected into the pull-down control signal SAN according to temperature and voltage. This may indicate that the configuration described with reference to FIGS. 4 and 5 in which four kinds of delay amounts are reflected can be modified to the configuration described with reference to FIGS. 6 and 7 in which three kinds of delay amounts are reflected. Furthermore, although three kinds of delay amounts are reflected into the pull-up control signal SAP and the pull-down control signal SAN, respectively, in the exemplary embodiment described with reference to FIGS. 6 and 7, four kinds of delay amounts may be reflected into the pull-up control signal SAP and the pull-down control signal SAN, respectively, according to temperature and voltage.

FIGS. 6 and 7 illustrate an example in which the pull-up control signal SAP and the pull-down control signal SAN are generated and used to perform a circuit operation. In that embodiment of the present invention, however, the pull-up control signal SAP and the pull-down control signal SAN can be applied as control signals for an over-driving operation and an under-driving operation.

Figure 8:
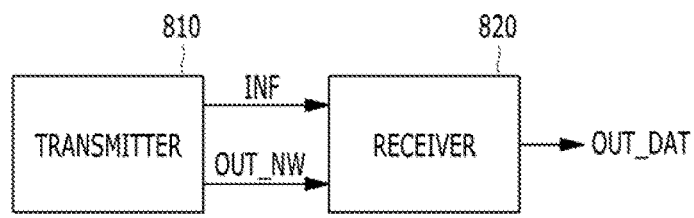
FIG. 8 is a block diagram illustrating a communication system in accordance with another embodiment of the present invention.

FIG. 8 is a block diagram illustrating a communication system in accordance with another embodiment of the present invention.

Referring to FIG. 8, the communication system may include a transmitter 810 and a receiver 820.

The transmitter 810 may transmit input data IN_DAT and unique characteristic information INF of the input data IN_DAT to the receiver 820. The unique characteristic information INF may include information corresponding to the unique characteristics of the transmission signal OUT_NW. The transmitter 810 may be the same as the semiconductor device described with reference to FIGS. 1 to 7. Thus, the transmitter 810 may generate the first conversion value QQQ and the second conversion value KKK by detecting first and second transition factors TF1 and TF2, and generate an transmission signal OUT_NW having the unique characteristic into which the first conversion value QQQ and the second conversion value KKK are reflected. For convenience, suppose that the first and second transition factors TF1 and TF2 are voltage and temperature, and the transmission signal OUT_NW of the transmitter 810 has unique characteristics for the transition point and the voltage level after transition. Thus, the voltage may be reflected into the transition point of the transmission signal OUT_NW, and the temperature may be reflected into the voltage level after transition of the transmission signal OUT_NW as described with reference to FIGS. 2 and 3.

The receiver 820 may analyze the transmission signal OUT_NW based on the unique characteristic information INF, and output analysis data OUT_DAT. In other words, the receiver 820 may identify two unique characteristics, that is the transition point and the voltage level after transition of the transmission signal OUT_NW from the unique characteristic information INF, detect the voltage based on the transition point of the transmission signal OUT_NW and detect the temperature based on the voltage level after transition of the transmission signal OUT_NW.

The communication system in accordance with the embodiment of the present invention may convert an output signal by reflecting a plurality of transition factors into the output signal, and then transmit the converted signal. Then, the communication system may receive the converted signal and detect the plurality of transition factors reflected into the unique characteristics of the signal.

Figure 9:
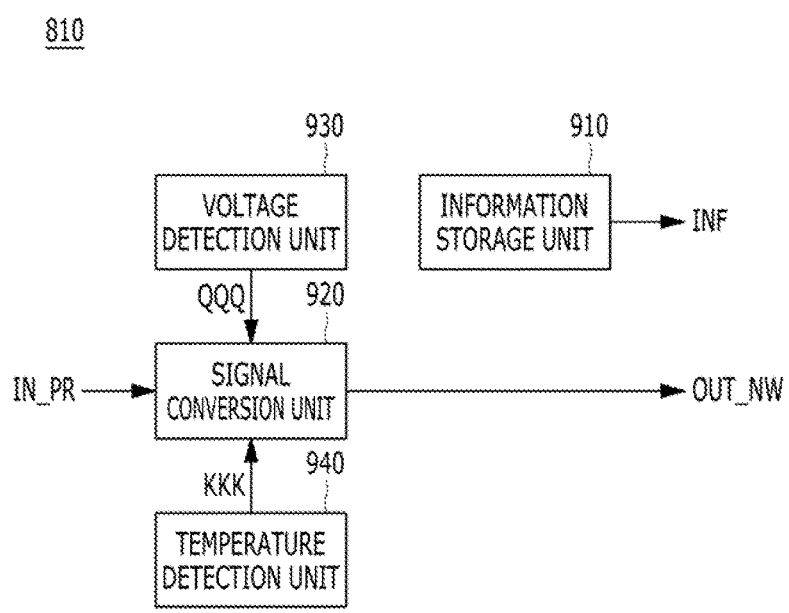
FIG. 9 is a block diagram illustrating a transmitter shown in FIG. 8.

FIG. 9 is a block diagram illustrating the transmitter 810 of FIG. 8. For convenience, an example in which two transition factors such as temperature and voltage are applied will be described.

Referring to FIGS. 8 and 9, the transmitter 810 may include an information storage unit 910, a signal conversion unit 920, a voltage detection unit 930, and a temperature detection unit 940.

The information storage unit 910 may store the unique characteristics of the transmission signal OUT_NW, and provide the unique characteristics to the receiver 820. The information storage unit 910 may be included in the receiver 820, or provided outside depending on design.

The signal conversion unit 920 may be the same as the signal converter 120 described with reference to FIGS. 1 to 5. The voltage detection unit 930 and the temperature detection unit 940 may correspond to the conversion value generator 110 described with reference to FIGS. 1 to 5.

The transmitter 810 in accordance with the embodiment of the present invention can generate the transmission signal OUT_NW into which the plurality of transition factors are reflected.

Figure 10:
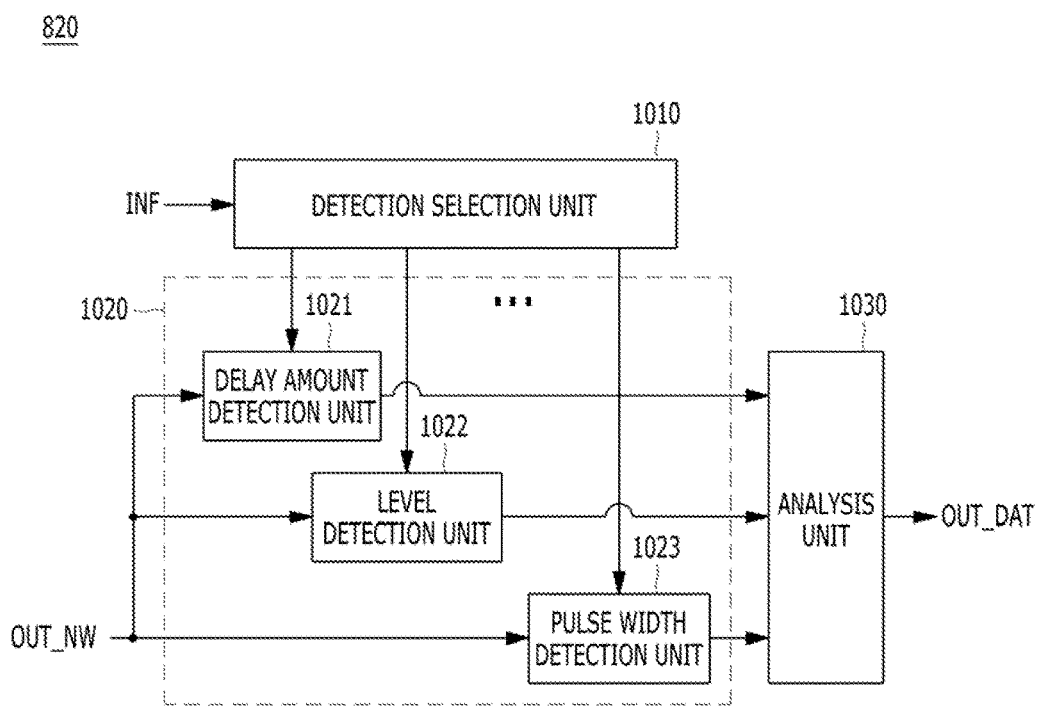
FIG. 10 is a block diagram illustrating a receiver shown in FIG. 8.

FIG. 10 is a block diagram illustrating the receiver 820 of FIG. 8. For example, suppose that the transition point and the voltage level after transition of the output signal generated by the transmitter 810 are unique characteristics.

Referring to FIG. 10, the receiver 820 may include a detection selection unit 1010, a plurality of detection units 1020, and an analysis unit 1030.

The detection selection unit 1010 may select a corresponding one of the detection units 1020 in response to the unique characteristic information INF. Since the transition point and the voltage level after transition are unique characteristics, a delay amount detection unit 1021 and a level detection unit 1022, which are capable of detecting the transition point and the voltage level after transition, can be selected from the plurality of detection units 1020. The delay amount detection unit 1021 may detect the transition point of the transmission signal OUT_NW generated by the transmitter 810, and the level detection unit 1022 may detect the voltage level after transition of the transmission signal OUT_NW generated by the transmitter 810. For reference, the detection units 1020 may include circuits capable of detecting various unique characteristics. For example, the plurality of detection units 1020 may include a pulse width detection unit 1023 capable of detecting a pulse width.

The analysis unit 1030 may analyze output signals of the plurality of detection units 1020. The analysis unit 1030 may detect the voltage based on the transition point of the transmission signal OUT_NW, and detect the temperature based on the voltage level after transition of the transmission signal OUT_NW. The analysis unit 1030 may output the detected voltage and the temperature as analysis data OUT_DAT. As a result, the analysis data OUT_DAT may include information corresponding to the voltage which is a result obtained by analyzing the transition point and information corresponding to the temperature which is a result obtained by analyzing the voltage level after transition.

The receiver 820 in accordance with the embodiment of the present invention may analyze the transmission signal OUT_NW generated by the transmitter 810, extract the voltage information and the temperature information which are included in the transmission signal OUT_NW, and output the extracted information as the analysis data OUT_DAT.

As described above, the semiconductor device in accordance with the embedment of the present invention may reflect various transition factors into an input signal. Furthermore, the semiconductor memory device can control the points of time at which the pull-up voltage and the pull-down voltage are applied, using the signal, according to the voltage and temperature. Furthermore, the communication system in accordance with the embodiment of the present invention can generate a transmission signal in which various transition factors are reflected, and transmit the generated signal. Then, the communication system can receive the transmitted signal and extract the transition factors reflected into the transmission signal.

In accordance with the embodiment of the present invention, the semiconductor device can obtain an output signal into which the surrounding environments are reflected, and the circuit receiving the output signal can maximize the operation efficiency based on the surrounding environment.

Although various embodiments have been described for illustrative purposes, it will be apparent to those skilled in the art that various changes and modifications may be made without departing from the spirit and scope of the invention as defined in the following claims.

For example, the positions and types of the logic gates and transistors used in the above-described embodiments may be set in different manners according to the polarities of input signals.

What is claimed is:

1. A semiconductor device comprising:
   a conversion value generator suitable for detecting first and second transition factors that are independent of each other, and generating first and second conversion values corresponding to the first and second transition factors, respectively; and
   a signal converter suitable for generating an output signal by reflecting the first and second conversion values into an input signal.

2. The semiconductor device of claim 1,
   wherein the input signal has one or more unique characteristics, and
   wherein values of the one or more unique characteristics are controlled in response to the first and second conversion values.

3. The semiconductor device of claim 1, wherein the conversion value generator comprises first and second detection units for detecting the first and second transition factors, respectively.

4. The semiconductor device of claim 1, wherein the signal converter comprises:
   a first conversion unit suitable for reflecting the first conversion value into the input signal; and
   a second conversion unit suitable for reflecting the second conversion value into an output signal of the first conversion unit.

5. The semiconductor device of claim 4, wherein the first conversion unit comprises:
   a plurality of reflection units each suitable for reflecting different reflection values to the input signal; and
   a path control unit suitable for selecting one or more output signals of the reflection units according to the first conversion value.

6. The semiconductor device of claim 4, wherein the second conversion unit comprises:
   a plurality of reflection units each suitable for reflecting different reflection values to the output signal of the first conversion unit; and
   a path control unit suitable for selecting one or more of output signals of the plural reflection units according to the second conversion value.

7. A semiconductor memory device comprising:
   a bit line sense amplifier suitable for sensing and amplifying data provided through a bit line coupled to a memory cell;
   a voltage driver suitable for providing pull-up/pull-down voltages to the bit line sense amplifier in response to first and second control signals;
   a conversion value generator suitable for detecting first and second transition factors that are independent of each other, and generating first and second conversion values corresponding to the first and second transition factors; and
   a sense amplification controller suitable for generating the first and second control signals by reflecting the first and second conversion values into an enable signal of the bit line sense amplifier.

8. The semiconductor memory device of claim 7, wherein the sense amplification controller controls a delay amount of the enable signal according to the first and second conversion values.

9. The semiconductor memory device of claim 7,
   wherein the sense amplification controller controls a transition sequence of the first and second control signals according to the first conversion value, and
   wherein the sense amplification controller controls a transition interval between the first and second control signals according to the second conversion value.

10. The semiconductor memory device of claim 7, wherein the first and second transition factors comprise a voltage and a temperature, respectively.

11. A communication system comprising:
    a transmitter suitable for generating a transmission signal having one or more unique characteristics into which first and second transition factors that are independent of each other are reflected; and
    a receiver suitable for receiving the transmission signal and detecting the first and second transition factors.

12. The communication system of claim 11, further comprising an information storage unit suitable for providing information on the one or unique characteristics to the receiver.

13. The communication system of claim 11, wherein the transmitter comprises:
    a conversion value generator suitable for detecting the first and second transition factors, and generating first and second conversion values corresponding to the first and second transition factors, respectively; and
    a signal converter suitable for generating the transmission signal by reflecting the first and second conversion values into an input signal.

14. The communication system of claim 13, wherein the conversion value generator comprises first and second detection units for detecting the first and second transition factors, respectively.

15. The communication system of claim 11, wherein the receiver comprises:
    a plurality of detection units suitable for detecting the unique characteristics of the transmission signal; and
    an analysis unit suitable for detecting the first and second transition factors based on output signals of the plurality of detection units.

16. The communication system of claim 15, further comprising a detection selection unit suitable for selecting a corresponding one of the detection units in response to information on the unique characteristics.

17. The communication system of claim 15, wherein the unique characteristics of the transmission signal comprise a transition point and a voltage level after transition of the transmission signal.

18. The communication system of claim 17, wherein the plurality of detection units comprise:
    a delay amount detection unit suitable for detecting the transition point of the transmission signal; and
    a level detection unit suitable for detecting the voltage level after transition of the transmission signal.

* * * * *